United States Patent [19]

Hunter

[11] 4,301,967

[45] Nov. 24, 1981

[54] INTERMITTENT SPRINKLER

[75] Inventor: Edwin J. Hunter, Santa Fe, Calif.

[73] Assignee: The Toro Company, San Marcos, Calif.

[21] Appl. No.: 105,399

[22] Filed: Dec. 19, 1979

Related U.S. Application Data

[62] Division of Ser. No. 827,787, Oct. 13, 1977, Pat. No. 4,294,642.

[51] Int. Cl.³ ............................................... B05B 1/08
[52] U.S. Cl. ........................................ 239/99; 91/280; 137/624.14; 239/533.15
[58] Field of Search ............... 137/624.14; 239/97–99, 239/101, 191, 533.15; 91/280, 460, 468

[56] References Cited

U.S. PATENT DOCUMENTS 3,393,873  7/1968  Larson ............................ 239/533.15
4,077,569  3/1978  Deines ................................ 239/101

FOREIGN PATENT DOCUMENTS 1044496 11/1958 Fed. Rep. of Germany ........ 239/99

Primary Examiner—Andres Kashnikow
Attorney, Agent, or Firm—Poms, Smith, Lande & Rose

[57] ABSTRACT

A low capital investment system for irrigating a relatively large area field, comprising a mobile base, and a sprinkler mounted on the base and adapted to accumulate water from a water supply and to intermittently discharge accumulated water in an irrigating stream over the field. Apparatus is provided for propelling the base in a back and forth movement traversing a field, and for generally reversing the water discharge direction each time the direction of travel is reversed. The sprinkler includes a novel, resiliently expandable reservoir construction for accumulating relatively large volume, intermittent bursts, and a drive system which also provides relatively short range, continual irrigation. Separate sprinkler units can be used on a field concurrently, or a single unit can be moved over successive areas of a field until the whole field has been covered.

11 Claims, 18 Drawing Figures

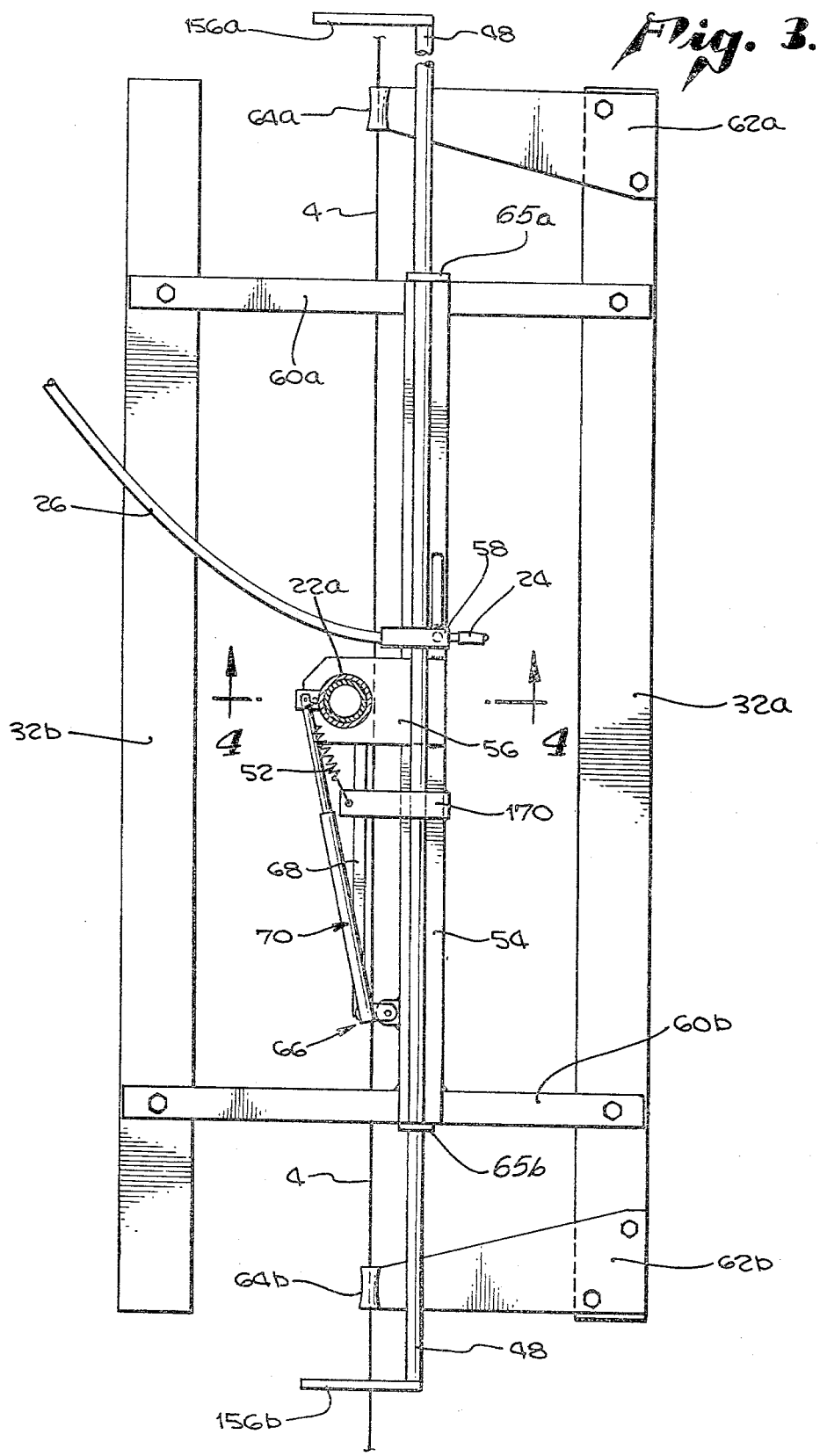

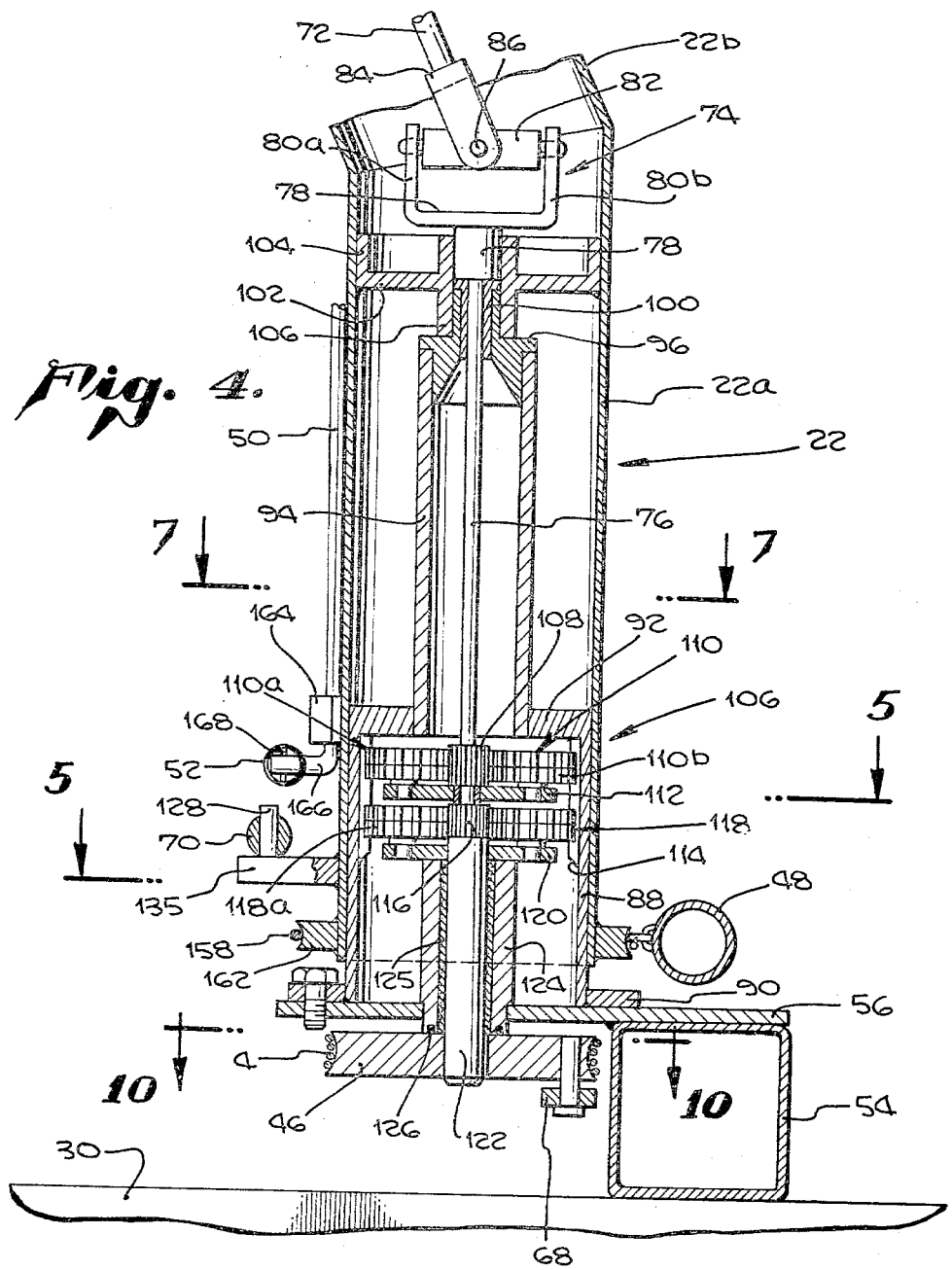

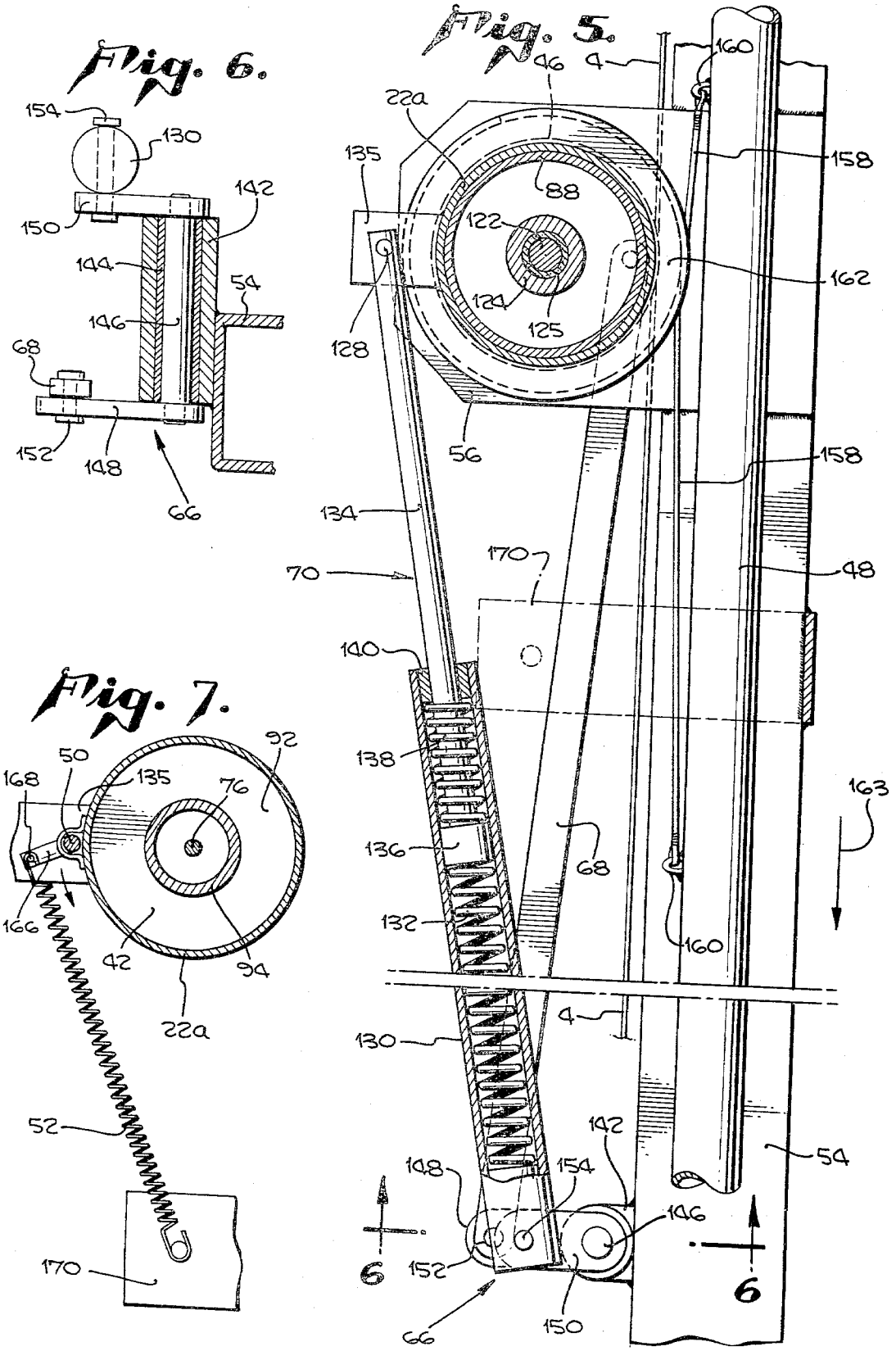

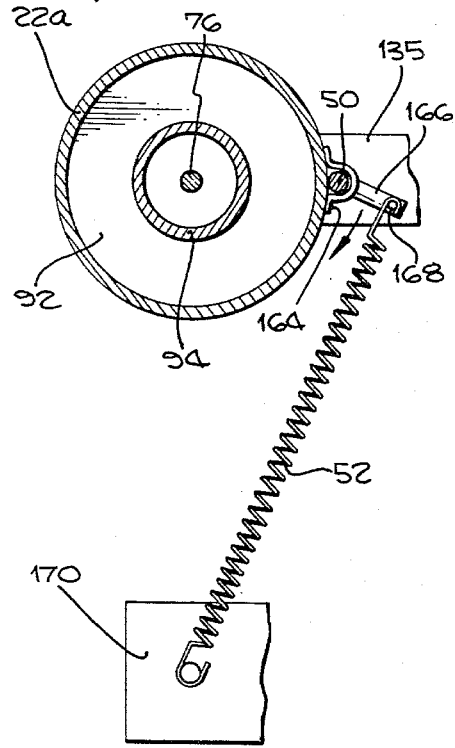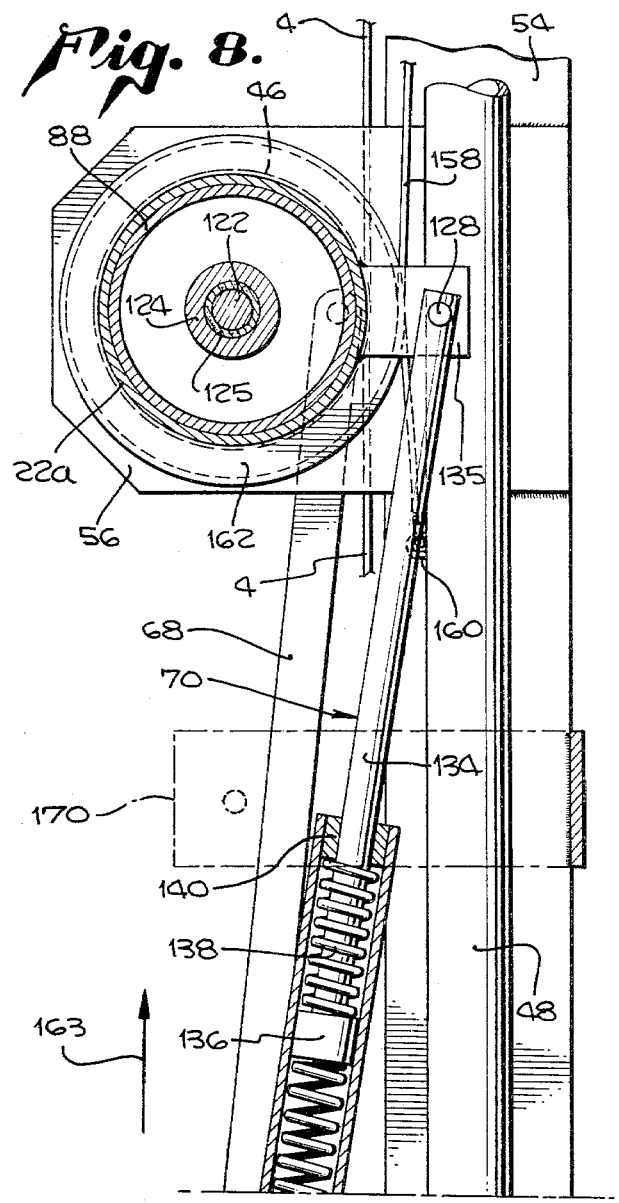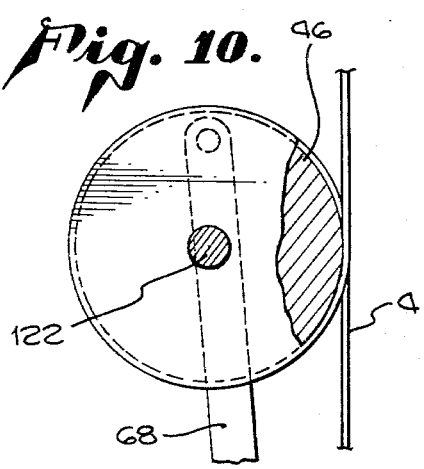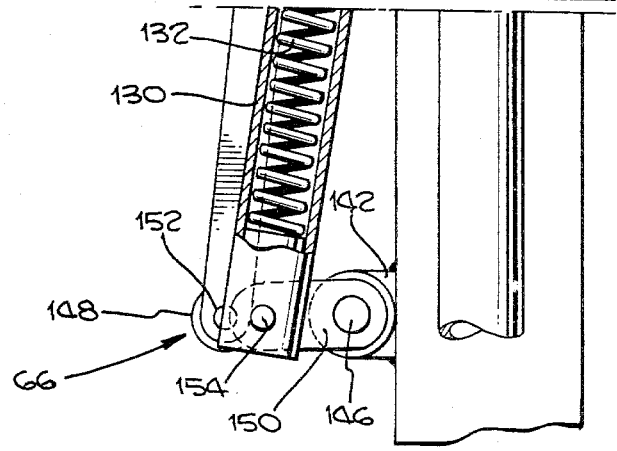

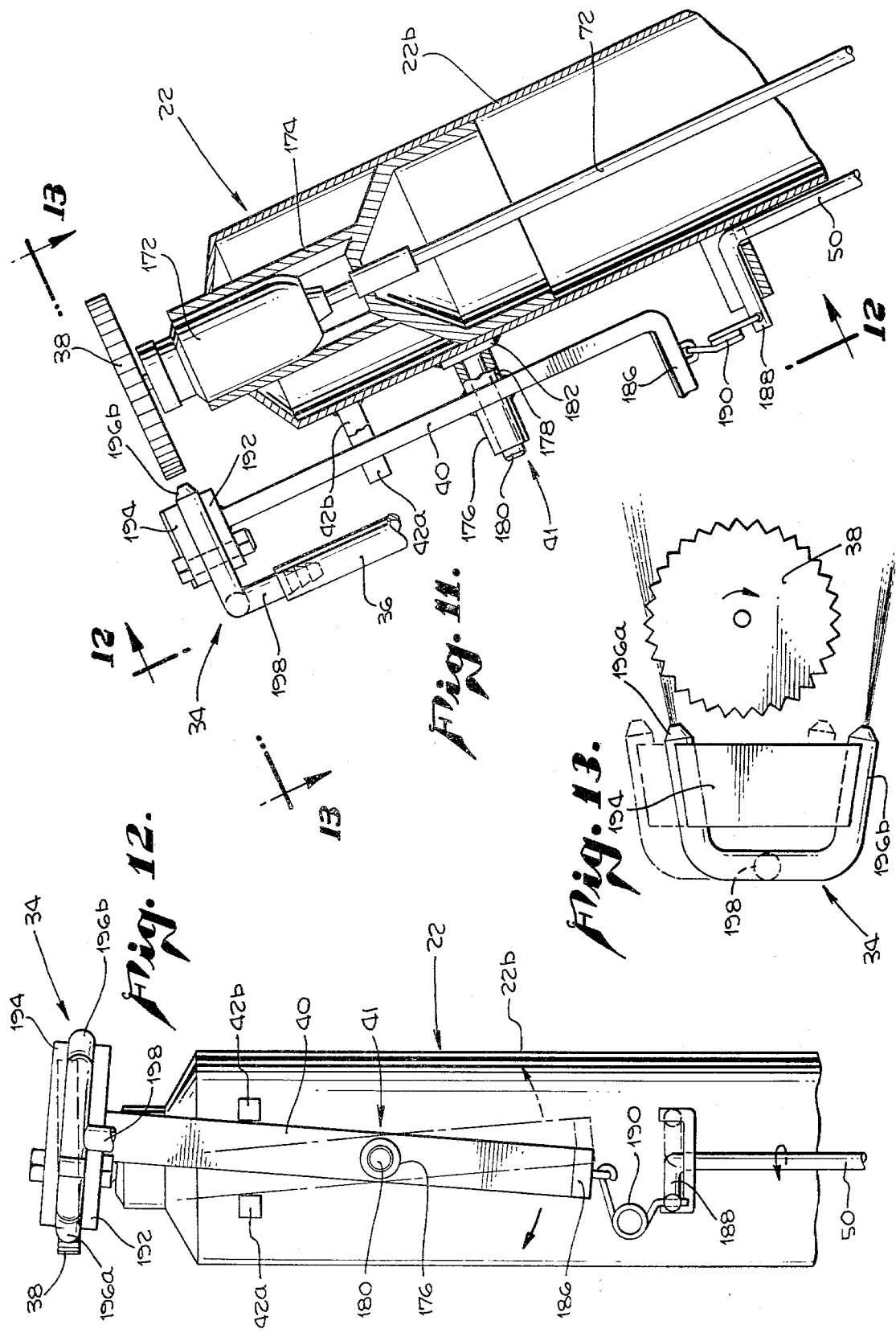

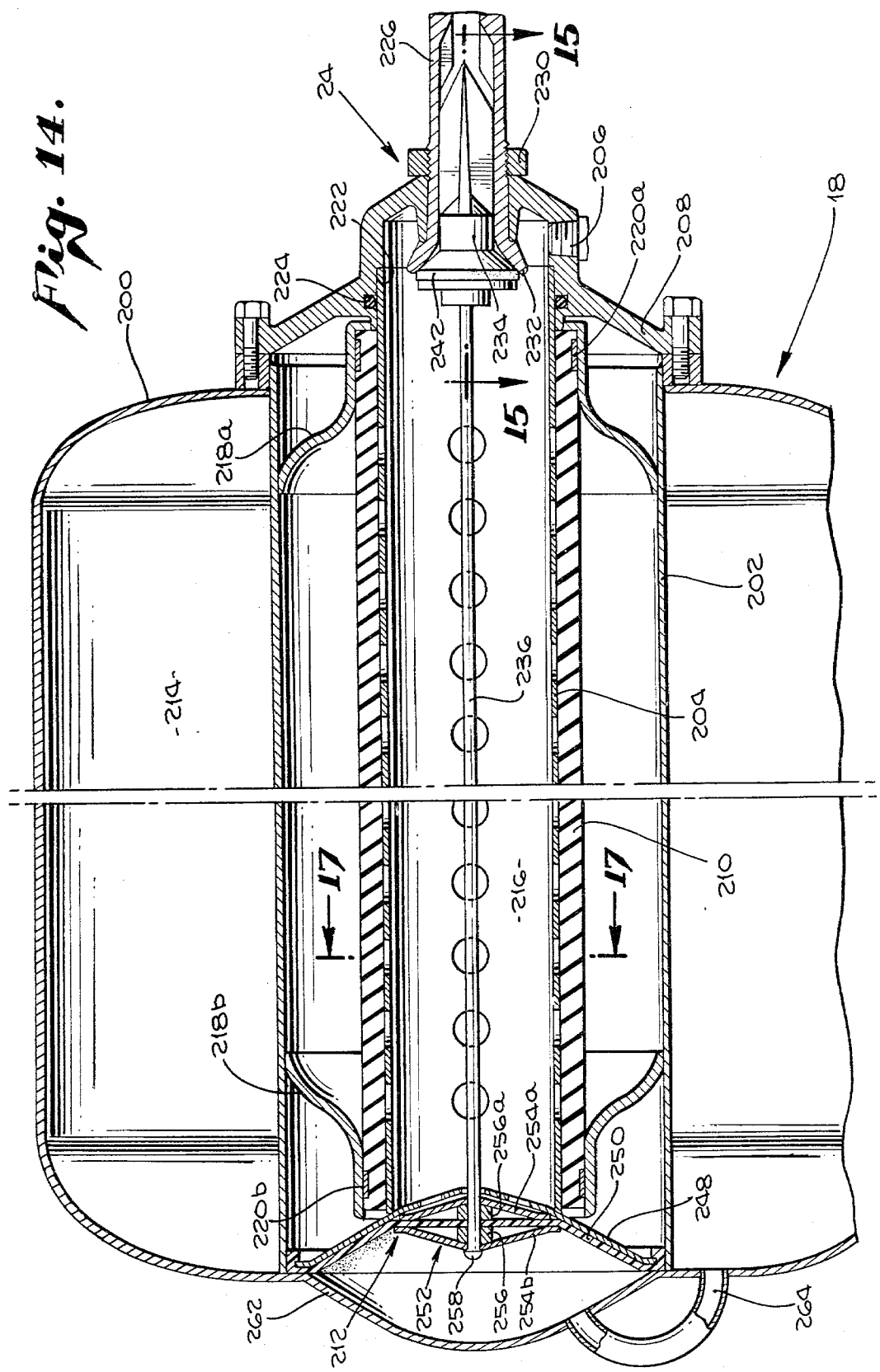

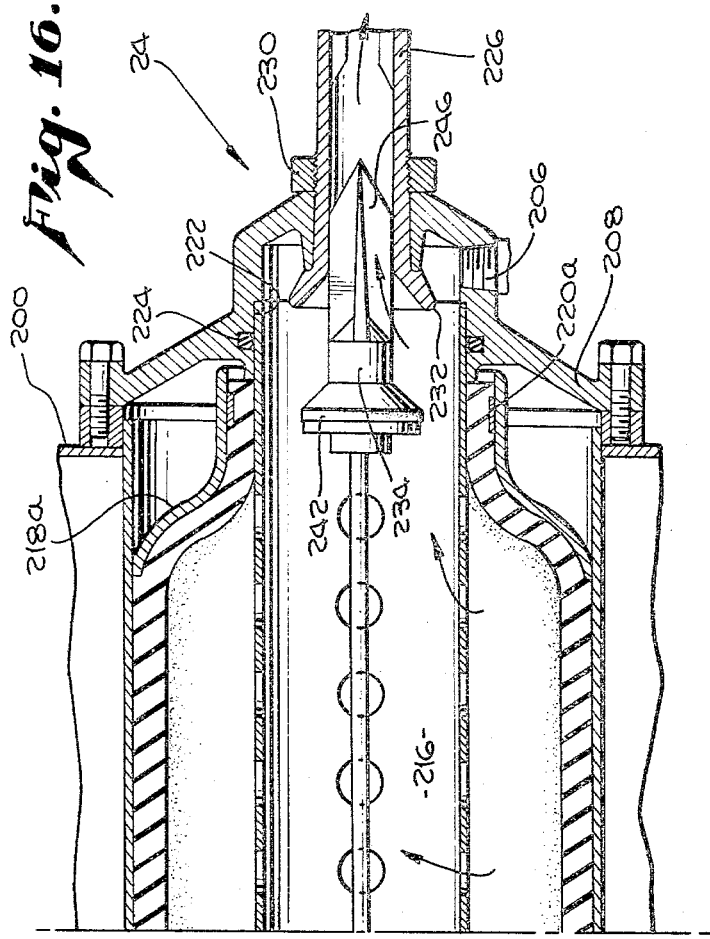
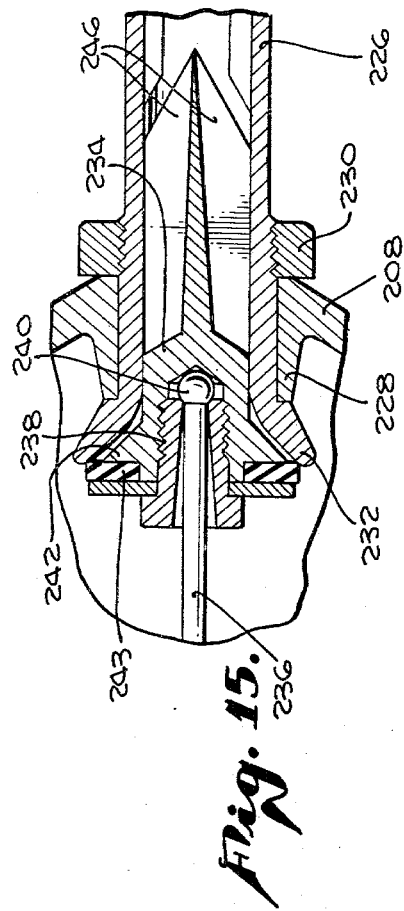
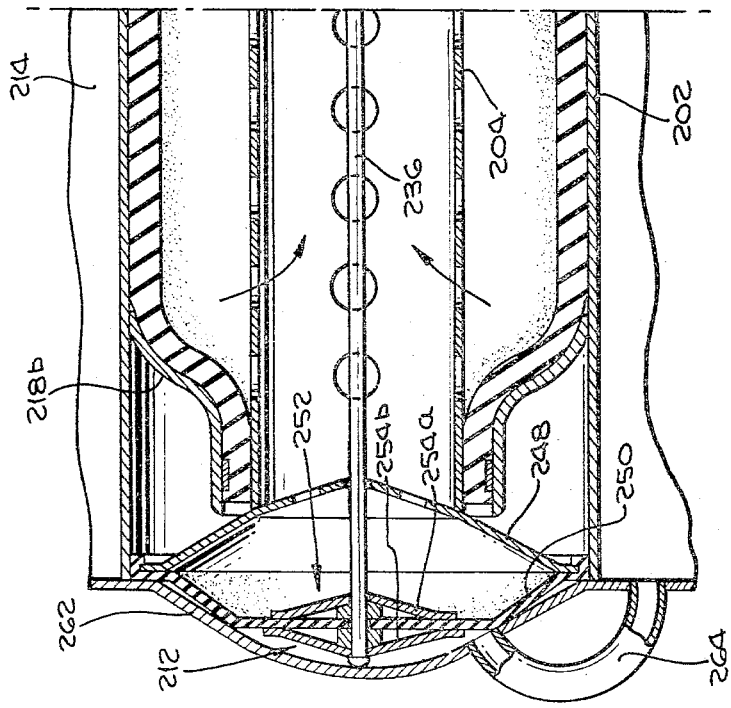
Fig. 16.
Fig. 15.
Fig. 17.

INTERMITTENT SPRINKLER

This is a division, of application Ser. No. 827,787, filed Oct. 13, 1977 now U.S..Pat. No. 4,294,642 issued May 27, 1980.

BACKGROUND OF THE INVENTION

The present invention relates in general to methods and sprinkler apparatus for irrigating agricultural fields. More specifically, the present invention relates to traveling sprinklers used to water large fields under agricultural cultivation wherein the sprinkler must traverse fairly large land areas in a continuous and fully automatic manner so as to apply needed water with a minimum of attention from an operator.

A common approach to the problem of irrigating a large area heretofore has been to utilize a self-propelled irrigation system which pivots around a central source of irrigation water and irrigates a generally circular configured area. These center-pivot irrigation systems generally consist of a plurality of individual units aligned in a linear series, each individual unit being provided with propulsion means for rotating about a center pivot. An alignment control device is required to keep the individual units in a linear alignment extending radially outward from the center pivot. These center pivot systems are generally limited to use in very large agricultural fields, which are typically square and at least one-half mile on a side. As water is distributed over a generally circular area, the corners of the agricultural field are often inadequately irrigated.

In addition to the terrain limitations inherent in a center-pivot system, such systems typically require an input water flow volume of at least 500 gallons per minute in order to adequately pressurize a distribution system, which is typically at least one-quarter mile long and which continuously applies water to the field being irrigated. With large quantities of water continually dispensed from the system, water is generally discharged onto the field as fast as it is received in order to avoid unnecessary accumulations which might weigh the system down. In U.S. Pat. No. 3,610,531 to Erickson, for example, linear traveling sprinkler apparatus is shown in which the sprinklers are operated while the system is stopped, energy from the flowing water is stored in a spring, and the stored energy is used to move the sprinkler line only when it is substantially empty.

Also, most center pivot systems are limited in application to use in areas where the nature of the soil permits a high rate of penetration of the irrigation water beneath the surface. This is necessitated by the continuous application of large volumes of water by the system. Additionally, the soil must have high load bearing properties when it is wet in order to support the drive wheels of the irrigation units and provide traction therefor.

Other types of traveling sprinklers have been known heretofore, such as in the prior U.S. Pat. No. 1,142,448, which traverse a strip configured portion of a field. This type of sprinkler travels along a cable, sprinkling continuously across the field as it is propelled by means of a cable wind-up reel. They are not designed for large area coverage such as a farm field or golf course, and are generally incapable of providing a relatively low irrigation rate to the area they do cover.

Another approach to solving the problem of irrigating a large area involves the use of an in-ground system in which sprinkler heads are distributed over the field and supplied with water by an underground conduit network. While such systems have been provided with intermittent type sprinklers to reduce the rate at which water is applied, the initial capital and installation costs are high and, unless relatively large amounts of water are required on a fairly regular basis, may be prohibitive.

Certain irrigation applications require a more flexible solution than available heretofore; one which is easily adaptable to smaller, irregularly shaped fields and is less expensive and less complex than the systems used in the large fields. More importantly, there exists a need for a relatively low cost, auxiliary or supplemental type irrigation system for use in localities which generally have adequate rain fall, but which are subject to unusually dry periods when temporary irrigation is required. In such localities the high costs of heretofore available large area systems may have inhibited the installation of any system at all.

In addition, there are irrigation needs where the type of soil under irrigation will not accept the amount of water which may otherwise be required to operate the sprinkler system. There is accordingly a need for a sprinkler irrigation system adaptable for use in areas where the soil does not allow rapid penetration of water, or is structurally unable to support and provide traction for the drive wheels of the system.

SUMMARY OF THE INVENTION

In view of the above problems associated with the prior art, an object of the present invention is the provision of a novel and improved low cost agricultural sprinkler system and method for use in localities which generally have an adequate rain fall and do not, under normal conditions, require artificial irrigation.

Another object is the provision of a novel and improved sprinkler system capable of providing a relatively low irrigation rate over a large area, for use in agricultural irrigation where the nature of the soil does not permit a high rate of penetration of the irrigation water beneath the surface.

Another object of the present invention is the provision of an improved traveling agricultural sprinkler which is relatively inexpensive to own and operate and which is suitable for use in both small and large agricultural fields having irregular configurations.

A further object of the present invention is the provision of an improvement in means for automatically propelling an agricultural sprinkler back and forth across a strip configured area of a field with a minimum of operator attention in a reliable manner.

Yet another object is the provision of a center-pivot irrigation system with a relatively low cost, supplemental intermittent sprinkler means adapted to substantially increase the area irrigated by said system.

The above objects are satisfied in the present invention by the provision a sprinkler system comprising a mobile base, a water supply sprinkler means mounted on the base for accumulating water from the supply and intermittently discharging a stream of accumulated water, and means for propelling the base across a field to be irrigated, and the method of operating the system. The base is propelled in a back and forth movement and water is discharged generally laterally to the direction of travel, such that a strip of the field is irrigated on each run.

In a preferred embodiment the sprinkler means comprises an accumulator housing with a resiliently expandable bladder which forms a reservoir to receive and accumulate water from the water supply. The bladder expands generally laterally to the discharge direction against an expansion limiting casing as water is accumulated. When a threshold water pressure is reached a pressure responsive diaphragm, which forms part of the reservoir wall, flexes to expose an outlet nozzle through which the accumulated water is discharged under pressure. Contraction of the bladder prolongs the discharge until a second threshold is reached, at which time the diaphragm flexes back to close the nozzle and the bladder rests against a perforated structural substrate.

In one embodiment the sprinkler is propelled along a guide wire extending across the field by means of a drive pulley rotatably mounted on the base and encircled by the guide wire, and means for rotably driving the pulley so that it pulls the base along the wire. The pulley is also used to oscillate the sprinkler as it travels over the field. In another embodiment, a linearly rigid guide rod is extended across the field, and the sprinkler propelled by means of a pair of pinch wheels adjacently mounted on the base and pinching the guide rod therebetween. In either case the drive force is preferably derived from a water wheel, and means are provided for diverting a portion of the water supply and directing it in a jet to rotate the wheel. Water from the jet apparatus is also directed onto the field at a short range relative to the intermittent stream, thereby providing close in irrigation.

Other features include the provision of a shift rod means, which engages a stop positioned on the field as the sprinkler approaches the stop, to reverse both the direction of sprinkler travel and the direction in which water is discharged from the sprinkler.

A more complete understanding of the present invention, as well as a recognition of additional objects and advantages, may be obtained by those skilled in the art from a consideration of the following detailed description of exemplary embodiments thereof. Reference will be made to the appended sheets of drawings, which will first be briefly described.

DESCRIPTION OF THE DRAWINGS

FIG. 3 is a plan view, through the plane 3—3 of FIG. 2, of a sled-like base for the sprinkler;

FIG. 4 is a sectional view, through the plane 4—4 of FIG. 3, showing details of the base drive system;

FIG. 5 is a sectional view, through the plane 5—5 of FIG. 4, showing a mechanism for reversing the direction of sprinkling when the sprinkler has reached the end of a field, and for oscillating the sprinkler during a traversal;

FIG. 6 is a partially cross-sectional view, through the plane 6—6 of FIG. 5, of a bell crank employed in the sprinkler oscillating structure;

FIG. 7 is a partially cross-sectional view, through the plane of 7—7 of FIG. 4, of part of the structure employed in reversing the direction of sprinkling;

FIGS. 8 and 9 are partially cross-sectional views similar to FIGS. 5 and 7, respectively, showing the sprinkler directional and oscillating mechanisms in a second position;

FIG. 10 is a partially cut-away view, through the plane 10—10 of FIG. 4, showing a pulley employed in the drive mechanism;

FIG. 11 is a cross-sectional view showing the actuating mechanism for the sprinkler drive system;

FIG. 12 is an elevation view, through the plane 12—12 of FIG. 11 showing portions of the control apparatus used in reversing the direction of sprinkler travel;

FIG. 13 is a plan view, through the plane 13—13 of FIG. 11, showing alternate positions of water drive apparatus which also provides near and intermediate distance constant sprinkling;

FIG. 14 is a sectional view, through the plane 14—14 of FIG. 2, of apparatus constructed in accordance with the invention for emitting an intermittent long distance spray;

FIG. 15 is a sectional view, through the plane 15—15 of FIG. 14, of the nozzle portion of the spraying apparatus shown in FIG. 14;

FIG. 16 is a sectional view similar to FIG. 14, showing the intermittent sprinkling apparatus at a second stage of the sprinkling cycle;

FIG. 17 is a sectional view, through the plane 17—17 of FIG. 14, of the expandable water containment apparatus employed in the intermittent sprinkler;

DETAILED DESCRIPTION OF PREFERRED EMBODIMENTS

Figure 1:
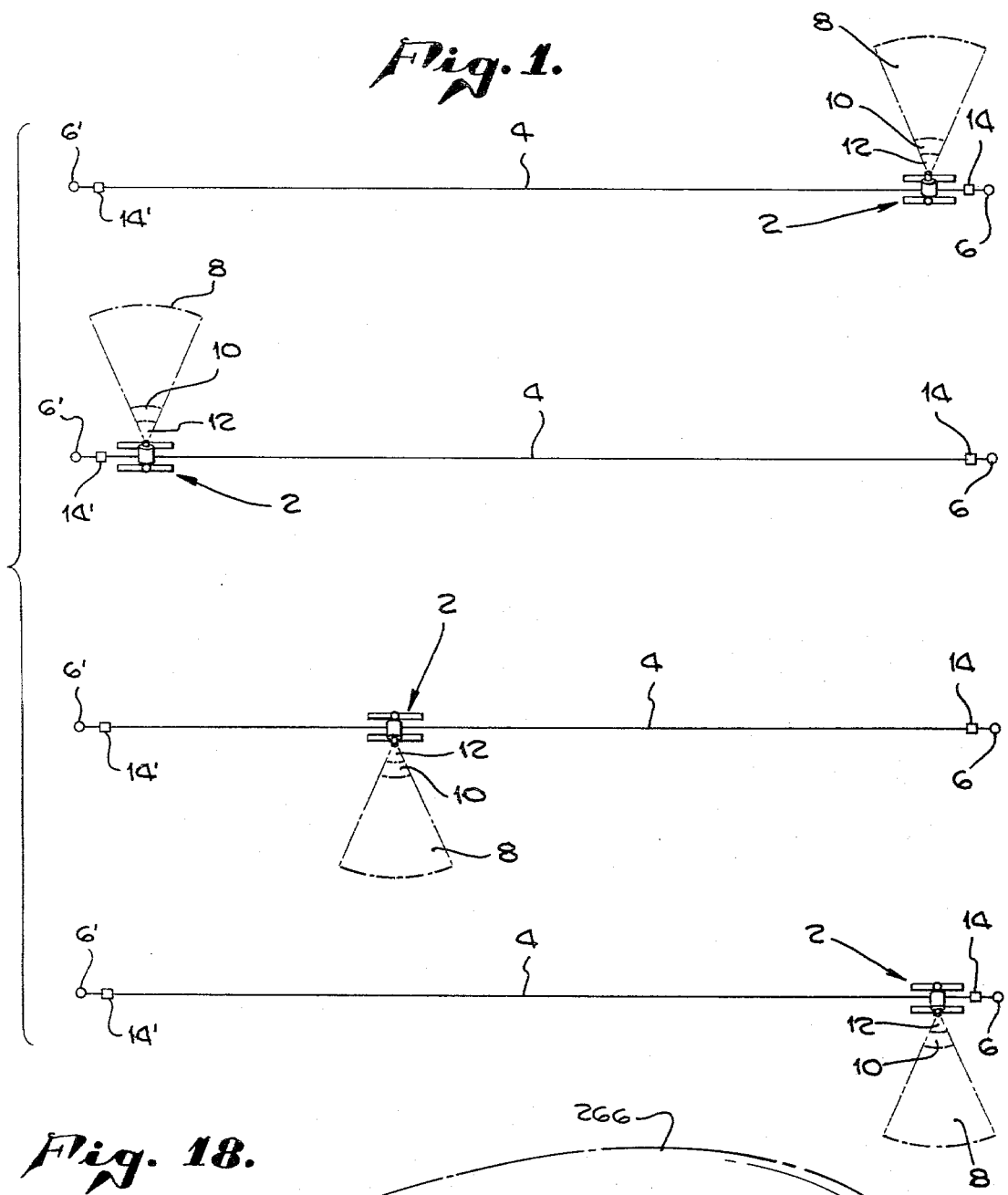
FIG. 1 is a plan view illustrating an agricultural field being irrigated by four mobile sprinklers in accordance with the invention.

An agricultural sprinkler system incorporating the present invention is shown in FIG. 1. A plurality of individual agricultural sprinklers 2, are shown, each being adapted to traverse a field and to irrigate a strip configured area thereof. The term "field" is used herein in a general sense, and includes crop fields, pasturage, large open areas such as golf courses and parks, and the like. The term "agricultural" is used in an equally broad sense. Each sprinkler is propelled along a guide wire 4 which extends across a portion of the field between guide wire anchors 6 and 6[1]. While the figure shows four separate sprinklers covering an entire field, their mobile capability would also permit irrigation with but a single sprinkler which is moved sequentially from one guide wire to the next after irrigating the portion of the field associated with each wire. This flexibility enables a trade-off to be achieved between capital cost and the time required to irrigate a field, the cost decreasing but the required time increasing as the total number of sprinklers is reduced.

Details of the spray pattern achieved with the exemplary embodiment depicted are provided hereinafter, but it should be noted at this point that in the preferred embodiment three zones of spraying are achieved. A first, long distance zone 8 is irrigated with an intermittent spraying pattern in which relatively high volume bursts of water are delivered at time-spaced intervals, such that a large area coverage is achieved with a relatively low amount of water expended per unit of area. An intermediate zone 10 is irrigated with a continual stream of water which is emitted from the sprinkler at a considerably lesser volumetric rate than the intermittent bursts. However, because its area is less than that of the long distance zone and the spraying is continual, the amount of water delivered to the intermediate zone per unit area may be similar to that for the long distance zone. A short distance zone 12 is also irrigated by a continual stream of water which is emitted from a sprinkler at the same volumetric rate as for the intermediate zone, but which is deflected to cover the zone closest to the sprinkler. In practice there is considerable overlap between the three irrigation zones, but the bulk of the water delivered falls into the pattern described above.

The traveling sprinklers traverse the field along their associated guide wires between opposed stop posts 14, 14[1], and are shown at four different points of the sprinkling cycle. Appropriate flexible water conduits, not shown in FIG. 1, are provided to supply each sprinkler with irrigation water. The topmost sprinkler is shown at the beginning of a right-to-left traverse, spraying to the right with respect to its direction of travel. In the preferred mode of operation it continues moving until it reaches the position of the second sprinkler, which is shown at the opposite end of the field, having just contacted its respective stop 14[1]. At this point water is still spraying in the same direction as during the preceding traversal of the field. The next sprinkler is at a later stage in the sprinkling cycle, having reversed both its direction of travel and its direction of sprinkling as a result of engaging its stop 14[1]. The bottom sprinkler is depicted at the end of a return traverse at the first contact stop 14, and is still sprinkling in the same direction as during the preceding left-to-right traverse. Further movement of this sprinkler into its associated right hand stop 14 reverses both its direction of travel and its direction of sprinkling, causing it to assume the state of the top sprinkler.

By traversing back and forth across the field and sprinkling in first one direction and then the opposite direction in so doing, each sprinkler irrigates a large area with a roughly uniform amount of water, while keeping the capital equipment requirements low. The area coverage is enhanced by the intermittent sprinkling device, which enables the achievement of long distance irrigation over a wide area without using more water than is necessary or desired.

Figure 2:
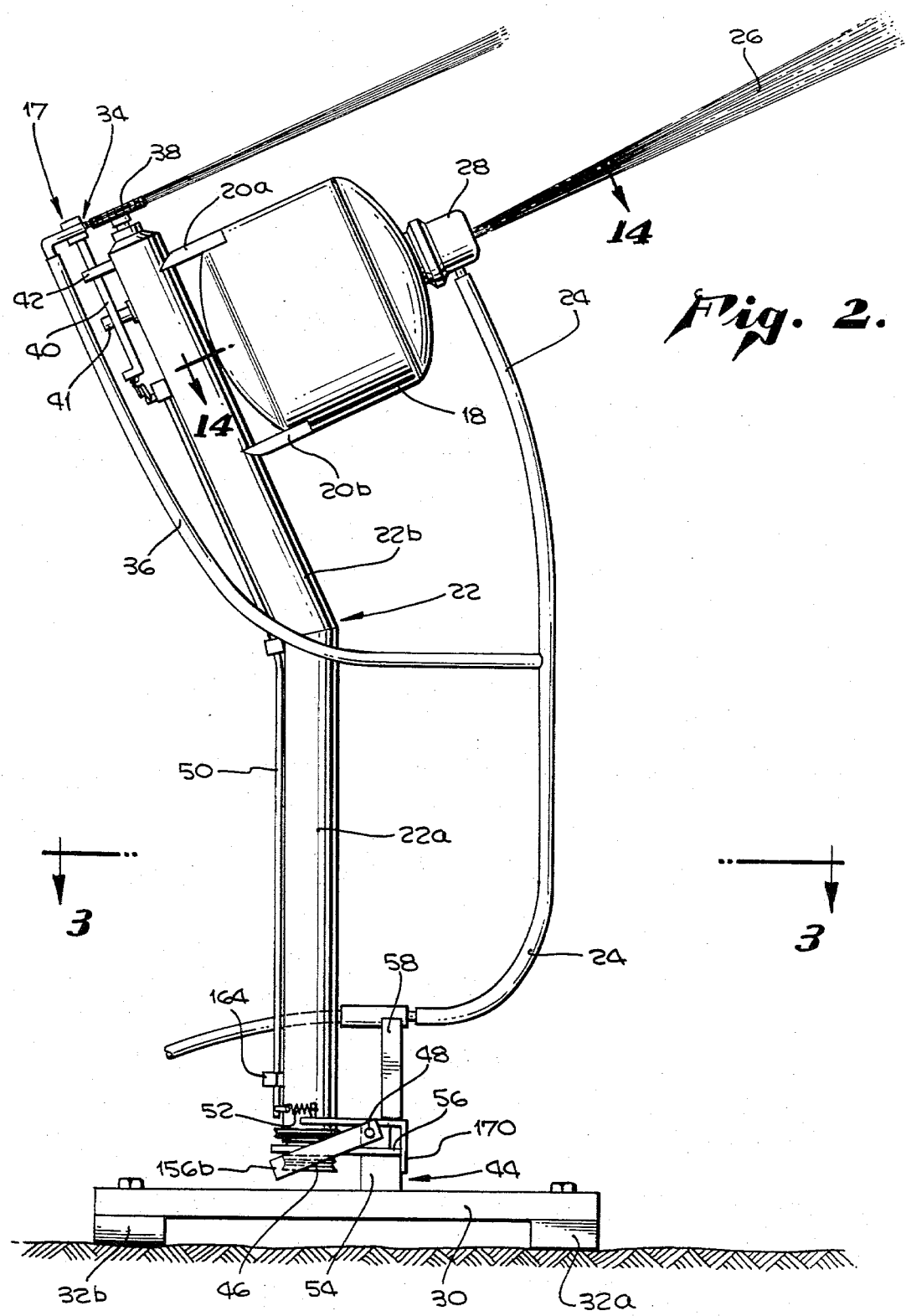
FIG. 2 is a side elevation view of a mobile agricultural sprinkler constructed in accordance with the invention, showing long distance intermittent spraying structure, a mobile base for supporting and transporting said structure, and a drive system for propelling the base.

Referring now to FIG. 2, the principal operating sections of a sprinkler constructed in accordance with the present invention are shown. The general features of the sprinkler apparatus will be discussed in connection with FIG. 2, with the details of the various components disclosed in subsequent figures. A water accumulator tank or housing 18 is mounted via welded brackets 20a and 20b to a tubular support pedestal generally indicated by reference numeral 22, the lower portion 22a of which is vertically disposed and the upper portion 22b of which is tilted at an angle such that the weight of the water in housing 18 is generally centered over lower portion 22a. Irrigating water is supplied through a conduit 24 to tank 18, which accumulates the water and intermittently emits a long distance stream or spray 26 through nozzle 28.

The support pedestal and accumulator tank are mounted on a base 30, which includes a pair of ground contacting runners 32a and 32b. The runners are preferably provided with forward and rear tip portions having generally upward sloping lower surfaces which allow them to traverse uneven terrain with a minimum amount of resistance.

A combined actuator for providing both a driving force to propel the sprinkler, and intermediate/short distance irrigation is provided at the top of pedestal 22. A jet forming orifice means 34 is supplied with pressurized water by a branch 36 of conduit 24. Orifice means 34 includes a pair of spaced orifices, both of which emit continual jets of water. A water turbine wheel 38, otherwise known as a Pelton wheel, is rotatably mounted at the top of upper support pedestal portion 22b in the path of one or the other of the jets emitted by orifice means 34. The orientation of the jet orifices is controlled by a partially rotatable support rod 40, pivotally mounted to the pedestal by a pivot pin 41 and rotationally constrained between a pair of spaced stops 42 on the pedestal.

Mounting and position control apparatus for pedestal 22 is carried on base 30 and generally indicated by reference numeral 44. This apparatus includes as its principle components a drive pulley 46 carried below pedestal 22 and coupled internally through the pedestal with turbine wheel 38 to propel the sprinkler across a field, a shift rod 48 which engages one of the rod stops 14 at each end of the field to reverse the direction of sprinkling, and means for reversing the direction of sprinkler travel. The last mentioned means includes a control rod 50 which is rotatably supported adjacent pedestal 22 and, together with a spring 52, couples jet support rod 40 with the base mounting mechanism. A structural beam 54 of generally square cross-section is mounted on the upper side of base 30, with a support plate 56 which actually carries the mounting for pedestal 22 rigidly attached to the beam. A conduit carrying member 58 also extends upwardly from plate 56 to support water supply conduit 26.

Referring now to FIG. 3, further details of the base are seen. Span members 60a and 60b are bolted between runners 32a and 32b to retain the runners in a generally parallel spaced relationship, and to provide support for beam 54. A pair of cantilever brackets 62a and 62b are bolted to the opposite ends of runner 32a and extend inwardly parallel to the base plane, terminating near the center of the base with generally cylindrical eyes 64a and 64b through which guide wire 4 extends. Upstanding, apertured mounting members 65a and 65b are carried respectively on span members 60a and 60b, with shift rod 48 captured within the apertures and limited thereby to an axial translation movement. The base structure further includes means for oscillating the sprinkler as the field is traversed, said means comprising a bell crank 66 affixed to beam 54, a first link 68 connected between one end of the bellcrank and the underside of drive pulley 46, and a spring biased telescoping link 70 connected between the other end of the bell crank and sprinkler support pedestal 22.

A more detailed view of the sprinkler drive mechanism is provided in FIG. 4. In this figure it is seen that support pedestal 22 comprises a hollow tube which houses major portions of the drive apparatus. An upper drive shaft 72 is coupled by a gear mechanism to water turbine wheel 38 at its upper end, and is rotated about its axis in response to rotation of the water wheel. Shaft 72 is connected through a universal joint, generally indicated by reference numeral 74, to a lower drive rod 76 which imparts a rotary drive motion to drive pulley 46 through a transmission system at its lower end. Universal joint 74 comprises a yoke 78 having a pair of upstanding arms 80a and 80b, each of which is slotted and retains a respective end of a crossbar 82 within its slot. Upper drive shaft 72 terminates in a forked clip 84 which is coupled to the center of crossbar 82 by a pivot connection 86 such that axial rotation of upper drive shaft 72 is translated through universal joint 74 to a similar axial rotation of lower drive shaft 76.

Support pedestal 22 is carried on mounting plate 56 by means of an inner housing 88, which extends upwardly from plate 56 and is secured thereto by welding, and an annular flange 90 which is bolted to plate 56. The outer diameter of housing 88 is slightly less than the inner diameter of pedestal 22, permitting the pedestal to be positioned co-axially over the housing and rotated axially with respect to the housing. At its upper end, approximately one-third of the height of lower pedestal portion 22a, housing 88 is covered by an annularly inward converging roof plate 92, which in turn supports a hollow tubular structural member 94 extending upwardly toward universal joint 74. A low friction bearing member 96 for lower drive shaft 76 is carried at the upper end of structural member 94, the drive shaft being provided with a head 78 which sits over and is rotatable with respect to a cap 100 inserted into bearing member 96. Pedestal support is provided by means of a rigid rotor member 102 which has a rim 104 welded to the inner wall of the pedestal, and a hub 106 which rests on bearing member 96 and rotates thereabout.

Drive pulley 46 is encircled several times by a guide wire 4 to insure good traction and eliminate slippage between the two components. The sprinkler apparatus is propelled across the ground by rotating pulley 46 about its axis, and thereby causing the pulley to wind up on guide wire 4 in one direction and to play out an equal amount of guide wire in the opposite direction. The rim of pulley 46 is preferably coarse in texture to enhance traction, or the guide wire may be provided in an alternate form such as a link chain which engages corresponding sprockets on the periphery of the pulley.

Pulley 46 is coupled by means of a transmission 106, housed within casing 88, for rotation by lower drive shaft 76. In the exemplary embodiment shown, transmission means 106 includes a two stage planetary gear reduction means for driving pulley 46 at a speed reduced from the speed of drive shaft 76, preferably by a 36:1 ratio. Exemplary of planetary gear transmissions adaptable to the present invention is the disclosure of co-pending application, Ser. No. 694,904 "Power Transmission for Self-Propelled Irrigation System", filed June 10, 1976 now U.S. Pat. No. 4,133,344 and assigned to the assignee of the present invention.

A two-stage gear reduction system is employed, with drive shaft 76 connected at its lower end to an input drive gear 108 which intermeshes with three planet gears, of which gears 110a and 110b are shown in FIG. 4. The planet gears are mounted on a first planetary carrier 112, and intermesh with an internally geared surface 114 of casing 88 so as to rotate about the pedestal axis when input drive gear 108 rotates. In thus rotating, the planet gears 110 precess about internal gear surface 114 and in so doing rotate planet carrier 112. A sun gear 116 depends from first planet carrier 112 and rotates therewith to drive a second set of three planet gears, of which gears 118a and 118b are shown in FIG. 4. A second planet carrier 120 is driven by planet gears 118 in the same manner as first planet carrier 112 is driven by first planet gears 110. Depending axially from the underside of second planet carrier 120 is a transmission output drive shaft 122 which is secured at its lower end to rotationally drive pulley 46. A guide collar 124 extends upwardly from mounting plate 56 annularly adjacent a packing 125 for output drive shaft 122 to prevent excessive oscillations of the drive shaft. An O ring 126 is lodged in a recess of the lower inner end of collar 124 to provide a low friction seal for the transmission lubricants.

As may be seen, planet gears 110 and 118 each comprise a pair of gear segments. The use of segmented planet gears increases the efficiency and reliability of the planetary gear assembly as the load on the assembly increases. Through the double system of planetary gears, the high speed of input drive gear 108 is reduced by a sequential transmission through the series of planetary gear assemblies to a low speed, high torque drive at transmission output shaft 122, and thereby at drive pulley 46.

The sprinkler support pedestal is continually rotated in an oscillatory motion during transit over a field by means of link 68, which is pivotally attached at one end to an off-center portion of drive pulley 46 by a first rivet and by spring biased link 70, which is pivotally attached at one end to the periphery of pedestal 22. Further details of the oscillating mechanism are shown in FIGS. 5, 6 and 10. Link 68 is a solid rod, while spring biased link 70 comprises a hollow cylinder 130 pivotally connected at one end to bell crank 66, a coil spring 132 housed within the cylinder, a connector rod 134 pivotally attached to a tab 135 on the periphery of pedestal 22 and extending into cylinder 130 at its other end, a head 136 affixed to the end of connector rod 134 within the cylinder adjacent spring 132, and a second coil spring 138 surrounding connector rod 134 and lodged within the cylinder between head 136 and a cylinder bushing cap 140. Bell crank 66, shown in FIG. 6, comprises an outer mounting block 142 welded to the side of beam 54, a low friction cylindrical bearing 144 disposed in a vertical bore in the mounting block, and a pin 146 extending through bearing 144 with arms 148 and 150 rigidly attached to its opposite ends adjacent the periphery of mounting block 142. Link 68 and cylinder 130 are pivotally attached to arms 148 and 150 by rivets 152 and 154, respectively. In operation, a rotation of drive pulley 46 to propel the sprinkler is transmitted by link 68 to an oscillatory movement of bell crank 66 about pin 146. This movement in turn is transmitted via link 70 to support pedestal 22, causing that member to oscillate back and forth through a limited rotational path so that the sprinkler sprays over an arc of approximately 30° as it traverses the field, enhancing the dispersion of water over the field.

Referring again to FIG. 3 in conjunction with FIGS. 4 and 5, means are shown for reversing the direction for sprinkling when the sprinkler has completed traversing a field in one direction and is about to return in the opposite direction. Shift rod 48 is provided with transverse contact arms 156a and 156b at its opposite ends, which arms normally rest upon guide wire 4 and are positioned to contact one of the rod stops 14 as the sprinkler approaches the stop at the end of a traverse. A wire 158 is attached to shift rod 48 at space locations by fasteners 160, and encircles a pulley 162 welded to the lower outer periphery of sprinkler support pedestal 22. Near the end of a traverse one of the shift rod contact arms 156 will hit a rod stop 14, holding the shift rod stationary as the sprinkler continues to move towards the stop. The relative motion thus produced between the shift rod and the remainder of the sprinkler apparatus causes wire 158 to rotate pulley 162 and thus pedestal 22. The dimensions of shift rod 48 and the spacing between wire fasteners 160 are selected such that sprinkler support pedestal 22 is shifted substantially by 180°.

FIG. 8 illustrates the position of the various oscillating and sprinkler rotation elements, with pedestal 22 rotated 180° from the position shown in FIG. 5. In this position the sprinkler is ready to traverse a field in the direction indicated by arrow 163. In rotating from the position of FIG. 5 to that of FIG. 8, pedestal 22 has moved in a counterclockwise direction. During the first half of this movement rod 134 moves against spring 132 further into cylinder 130, and then returns to near its original position with respect to the cylinder as the pedestal continues rotating to the position shown in FIG. 8.

Apparatus for rotating control rod 50, and thereby reversing the direction of sprinkler travel, is shown in FIGS. 2-4 and 7. The lower end of the control rod 50 is held adjacent pedestal 22 by a U-shaped bracket 164. The rod terminates in an outwardly bent finger 166, through which a pin 168 secured to spring 52 extends. The other end of the spring is attached to a bracket 170 which extends upwardly from beam 54 to the level of the control rod. As shown in FIG. 7, the dimension of spring 52 is such that it is slightly stretched when pedestal 22 is at a fully rotated operating position, and acts upon finger 166 to hold control rod 50 in a first rotational position with respect to pedestal 22.

When the pedestal is rotated by 180° at the end of a traverse, as described above, spring 52 acts upon finger 166 to rotate control rod 50 in a clockwise direction with respect to the pedestal, terminating in the position shown in FIG. 9. In order to ensure a complete 180° rotation of the pedestal and prevent the sprinkler propulsion apparatus from stalling, spring 52 is tensioned so that control rod 50 does not rotate on the pedestal until just before the pedestal has reached the end of its 180° rotation. Various snap action devices may be incorporated on control rod 50 and its associated support structure to prevent an earlier rotation of the rod, and to ensure that the rod rotates fully at the required time.

Details of the water powered drive mechanism for drive pulley 46 are provided in FIGS. 11-13. Pelton wheel 38 provides an actuating power input, driving the input gear to a three-stage planetary gear system housed in a transmission casing 192, which produces an output rotational drive on upper drive shaft 72. The gear system effects a 200:1 speed reduction between Pelton wheel 38 and the upper drive shaft. A support structure 174 for the transmission housing and upper drive shaft 72 is provided internally within pedestal 22, and rotates with the pedestal.

It will be recalled that Pelton wheel 38 is driven by a water jet from jet mechanism 34. The jet support rod 40 is rotatably mounted to pedestal 22 between a pair of nuts 176 and 178 on a pivot pin 180, which pin extends outwardly from a base plate 82 welded to the exterior of upper pedestal portion 22b. Support rod 40 is rotatable about pin 180 between spaced stops 42a and 42b welded to pedestal 22b above pin 180. The support rod terminates at its lower end with an outwardly extending finger 186, which is coupled to a similar finger 188 at the upper end of control rod 50 by a torsion spring 190. Axial rotation of the control rod 50 is transmitted through spring 190 and received as a rotational movement by jet support rod 40, as indicated in FIG. 12.

The water jet assembly 34 is carried at the upper end of support rod 40 and bolted in place between a lower plate 192, welded to the upper end of the support rod 40, and an upper plate 194. Jet assembly 34 comprises a pair of spaced outlet orifices 196a and 196b having a common inlet pipe 198 which is supplied with water from conduit 36. The jet assembly is disposed such that Pelton wheel 38 is rotated by a jet of water emitted by one or the other of orifices 196a and 196b. As best shown in FIG. 13, the rotational direction of Pelton wheel 38 is determined by which one of the two water jets is incident upon the wheel. This in turn determines the rotational direction of drive pulley 46, and accordingly the direction in which the sprinkler is propelled across the field. In FIG. 13 the water emitted from left hand orifice 196a is shown striking Pelton wheel 38, causing it to rotate in a clockwise direction as seen from above. This corresponds to the orientation of control rod 50 as shown in FIG. 9. At the end of a traverse, control rod 50 is rotated with respect to pedestal 22 as described above, and assumes the position shown in phantom lines in FIG. 13. In this position the water jet emitted from right hand jet orifice 196b strikes Pelton wheel 19 and causes it to rotate in a counter-clockwise direction, thereby reversing the direction of sprinkler travel. The positions of support rod 40 corresponding to clockwise and counter-clockwise Pelton wheel rotation are indicated in FIG. 12 in solid and phantom lines, respectively.

Referring now to FIG. 14, water accumulator housing or tank 18 comprises in general an outer tank portion 200, an inner casing 202 defining an interior reservoir, a perforated cylinder 204 positioned to receive a water supply through a port 206 in a cap 208 bolted over tank 200, a resiliently flexible, rubber-like bladder 210 retained between cylinder 204 and casing 202 and normally resting against the outer surface of cylinder 204, and a diaphragm section generally indicated at 212 which is used to actuate an intermittent, long distance spray.

The various sprinkler sections will now be described in further detail. Casing 202 divides tank 200 into two sections: an outer air plenum 214 between the external wall of casing 202 and the inner wall of tank 200, and a water reservoir 216 internal to the bladder. Annular fittings 218a and 218b are attached respectively at the upper and lower portions of the tank between casing 202 and bladder 210 to further define the limits of the water reservoir. Annular gaskets 220a and 220b are provided in corresponding grooves in bladder 210 to seal the joints between the bladder and fittings 218a and 218b. An annular channel 222 is formed in the inner wall of tank cap 208 to accomodate the upper end of perforated cylinder 204, with an O-ring seal 224 disposed in an annular groove which opens to channel 222.

Details of the nozzle assembly are shown in FIG. 15. A shaped member 226 defining an outlet orifice is held in a central opening in cap 208, between a downward facing shelf 228 on the cap and an interior threaded ring 230 which engages matching threads on the outer surface of outlet member 226 just above cap 208. The lower end of outlet member 226 is flared outwardly to form a seat 232 for a valve which controls the discharge of irrigating water through outlet member 226. A piston 234 is retained in outlet member 226 at the upper end of a connector rod 236 from diaphragm section 212. A plug 238 is threaded into the lower end of piston 234, and includes a central opening adapted to receive a ball 240 at the upper end of connector rod 236 and retain said ball against piston 234. A rubber-like valve washer 242 extending radially outwardly from piston 234 is retained at the lower end of the piston, between a downward facing shelf 243 on the piston faces of piston 234 and plug 238. Valve washer 242 is aligned with flared valve seat 232 to form a seal and block the escape of any water from tank 200 outwardly through outlet member 226 when connector rod 236 is in the raised position shown in FIG. 15. The upper portion of piston 234 comprises a plurality of vanes 246 adapted to form water discharged through outlet 226 into a suitable long-distance irrigating stream.

Referring back to FIG. 14, diaphragm section 212 includes a downward facing metallic bowl 248 which is secured to the lower end of cylinder 204 and extends outwardly towards the lower end of casing 202, a stiffly flexible, resilient bowed diaphragm 250 spanning the lower end of casing 202 and retained at its outer edge between bowl 248, casing 202, and tank 200, and connector means 252 securing a central portion of diaphragm 250 to the lower end of connector rod 236. Connector means 252 comprises a pair of bowed plates 254a and 254b which are centrally secured to opposite faces of diaphragm 250 such that the portion of the diaphragm between the plates is held flat, and a pair of sealing gaskets 256a and 256b lodged between the diaphragm and each of the bowed plates, respectively. Each of the above mentioned members of the diaphragm section is provided with an axial opening of sufficient dimension to accomodate connector rod 236, which extends through the axial openings and is retained against the lower face of plate 254b by a knob 258 at its lower end. The portion of bowl 248 interior to cylinder 204 has a plurality of perforations which enable diaphragm 250 to be flexed downwardly by the pressure of the water in reservoir 216. The lower end of tank 200 is shaped with an outward bulge forming a second plenum 262 to increase the distance through which diaphragm 250 may flex. The second plenum below the diaphragm is connected to first plenum 214 through a conduit 264, thereby enabling the escape of air from directly below the diaphragm as the diaphragm is flexed downwardly.

The operation of the accumulator tank will now be described with reference to FIGS. 14 and 16. In FIG. 14 it may be assumed that a water stream has just been discharged from the tank, and it is ready to begin another sprinkling cycle. Some residual water is left in reservoir 216, but its volume will be insufficient to appreciably expand bladder 210 away from contact with the outer wall of cylinder 204, which forms a substrate limiting inward contraction of the bladder. Also, diaphragm 250 is shown in its normal upward position adjacent bowl 248. In this position piston 234 is forced upward into outlet 226, pressing valve washer 242 against vavle seat 232 and thereby preventing any water from leaving the tank through the outlet.

As water accumulates in the tank, bladder 210 is gradually expanded laterally outward away from cylinder 204, until eventually it comes into contact with casing 202. As water continues to accumulate, casing 202 limits further expansion of the bladder, and the water pressure therein builds up until it exceeds the air pressure below diaphragm 250 by an amount sufficient to flex the diaphragm downwardly. This in turn unseats piston 234 from outlet 226, permitting water to be discharged under pressure through the outlet in an irrigating stream. The initiation of outward water flow reduces the net closing pressure against piston 234, causing diaphragm 250 to snap downward to a position, shown in FIG. 16, against tank bulge 262. The interior water pressure forces a high speed stream through the outlet, resulting in a long distance irrigation.

As the volume of water inside the tank is progressively reduced, bladder 210 flexes back towards its original position from the outward flexed position shown in FIG. 16, thereby retarding a decrease in water pressure inside of the tank and sustaining a high speed water flow through the outlet for a greater volume of water than would be achieved without the use of an inflatable means such as bladder 210. The outward water flow continues until bladder 210 has returned to its original position adjacent cylinder 201, at which time the reduced water pressure inside the tank causes diaphragm 250 to flex back upwardly to the position shown in FIG. 14, forcing piston 234 upward until the valve formed by washer 242 and seat 232 is closed. At this point a spraying cycle is completed, and another cycle commences as water is introduced into the tank through inlet port 206.

In operation, water enters the bladder reservoir under a line pressure of typically 100 p.s.i. and accumulates until the water pressure in the bladder reaches a threshold level of about 95 p.s.i. At this pressure diaphragm section 212 moves down, permitting a burst of water to be discharged through the outlet orifice. When enough water has been discharged to reduce the bladder water pressure to a second threshold level, typically about 76 p.s.i., the nozzle is again closed and water again begins to accumulate in preparation for another burst. With the drive systems described above, the sprinkler is preferably propelled at a speed of about one foot per minute, and delivers about 1,600 gallons per acre on each run.

Figure 18:
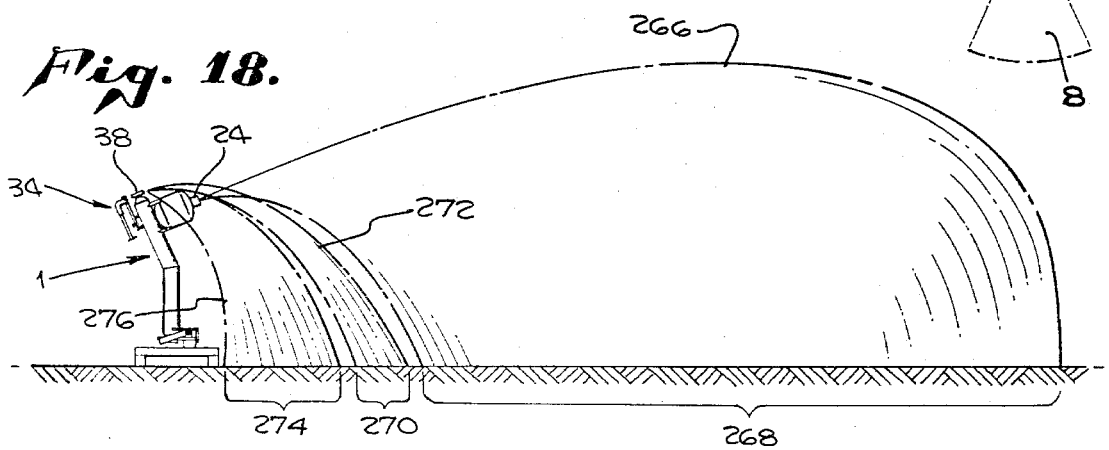
FIG. 18 is an elevation view illustrating the spray pattern achieved with the embodiment of FIGS. 1—17.

A typical spray pattern achieved with the sprinkler system described thus far is illustrated in FIG. 18. The intermittent stream 266 emitted from nozzle 24, due to its relatively greater volumetric flow rate and expulsion pressure from the sprinkler, is dispersed over a broad area 268. An intermediate and much smaller area 270 is covered by the continual stream 272 from jet means 34 which does not impact Pelton wheel 38. The area 274 closest to the sprinkler is irrigated by stream 276 from the other jet produced by jet means 34 which drives the Pelton wheel. While the continual irrigating streams 272 and 276 provide some relatively close-in irrigation that would not otherwise be achieved, it should be understood that the primary irrigation results from the long distance intermittent spray.

From the foregoing description of various exemplary embodiments of the present invention in improved traveling and intermittently spraying agricultural sprinklers, it should be readily apparent to those skilled in the art that the aforestated objects of the present invention have been achieved. While the invention has been described in detail, with particular reference to certain exemplary embodiments thereof, it is to be understood that numerous modifications thereof may be made by one skilled in the art and still come within the scope and spirit of the invention, which is only limited by the terms of the following claims.

I claim:

1. Intermittent sprinkler apparatus, comprising, a housing,
    an expandable water accumulating reservoir, disposed within said housing,
    means for supplying irrigating water through said housing to said reservoir, said reservoir comprising a flexible, resilient bladder means mounted within said housing to receive water from said water supply, nozzle means on said housing providing a discharge outlet from said reservoir, blocking means moveable between a first position blocking said nozzle means, and a second position exposing a water discharge path from said reservoir through said nozzle means, and means responsive to the pressure of the water accumulated in said reservoir exceeding a predetermined threshold level for moving the blocking means from said first to said second position, and for returning said blocking means to said first position when said reservoir pressure falls below a second threshold level following discharge of water through said nozzle means, said first threshold level corresponding to a pressure at which said reservoir is substantially expanded.

2. The intermittent sprinkler of claim 1, further comprising structure within said housing defining inner and outer limits of contraction and expansion respectively for said reservoir bladder means.

3. The intermittent sprinkler of claim 1, said bladder means being mounted in said reservoir for expansion generally lateral to the water discharge direction.

4. The intermittent sprinkler of claim 1, further comprising inner support structure for said bladder means, said structure comprising a water permeable substrate defining an inner limit of bladder means contraction, said substrate being disposed within said housing to receive the water supply, and to provide a path for outward water transmission through the substrate to the bladder means.

5. The intermittent sprinkler of claim 1, said means for moving the blocking means including a flexible, resilient member normally urging the blocking means towards said first position.

6. The intermittent sprinkler of claim 5, said member for moving the blocking member comprising a diaphragm forming a portion of the reservoir, and connector rod means coupling said diaphragm with said blocking means.

7. The intermittent sprinkler of claim 6, further comprising a perforated substrate structure mounted internally within said housing and providing a limit to flexing of said diaphragm toward said nozzle means.

8. The intermittent sprinkler of claim 6, further comprising an air plenum within said housing on the opposite side of said diaphragm from said water accumulating reservoir.

9. Intermittent sprinkler apparatus comprising:

a housing and an expandable water accumulating reservoir disposed within said housing, said housing defining an air space generally surrounding said reservoir, means for supplying irrigating water through said housing to said reservoir, nozzle means on said housing providing a discharge outlet from said reservoir, blocking means moveable between a first position blocking said nozzle means, and a second position exposing water discharge path from said reservoir through said nozzle means, and discharge means responsive to the pressure of water accumulated in said reservoir exceeding a predetermined threshold level for moving the blocking means from said first to said second position, and for returning said blocking means to said first position when said reservoir pressure falls below a second threshold level following discharge of water through said nozzle, said first threshold level corresponding to a pressure at which said reservoir means is substantially expanded, said means for moving the blocking means including a flexible, resilient diaphragm forming a portion of the reservoir and coupling means for coupling said diaphragm with said blocking means, said diaphragm normally urging the blocking means towards said first position, and an air plenum within said housing on the opposite side of said diaphragm from said water accumulating reservoir, and air conduit means connecting said air space with said air plenum.

10. An intermittent sprinkler, comprising:

an outer housing, a water discharge nozzle in said housing, water inlet means for introducing irrigating water into said housing, an expandable bladder means mounted within said housing to receive water entering said housing through said inlet means, said bladder means forming a reservoir for accumulating supply water, a casing means mounted within said housing surrounding said bladder means generally lateral to the direction of discharge through said nozzle, said casing means defining an outer expansion limit for said bladder means said casing means being located within said housing to leave an air space between it and the outer housing wall, an outlet means positioned at one end of said reservoir formed by said bladder means, a flexible, resilient diaphragm mounted at the other end of said bladder means from said nozzle and forming a portion of the reservoir wall, said diaphragm normally assuming an inward position toward said nozzle, a blocking plug for said nozzle; and connector rod means carrying said plug at one end and engaging said diaphragm at its other end, said connector rod means normally holding said plug in a position blocking a discharge of water from the reservoir through said nozzle, said diaphragm being outwardly reflexible in response to an increase in pressure within said reservoir to move said plug away from said blocking position, the above elements being selected such that the plug is held in a blocking position during accumulation of water within the reservoir until said bladder means has expanded substantially to the limit defined by said casing means and said diaphragm flexes outwardly in response to further water accumulation, thereby permitting the discharge of water from said reservoir through said outlet means by contraction of said bladder means back to an original shape.

11. The intermittent sprinkler of claim 10, and further including a cylindrical substrate structure mounted within said housing and defining an inner limit of contraction for said bladder means, said bladder means being mounted adjacent the outer periphery of said substrate, said substrate being perforated to enable a flow of accumulated water outwardly against the bladder means.

* * * * *